Oct. 22, 1940.  W. M. GAMBILL  2,219,225
FISH LURE
Filed July 18, 1939
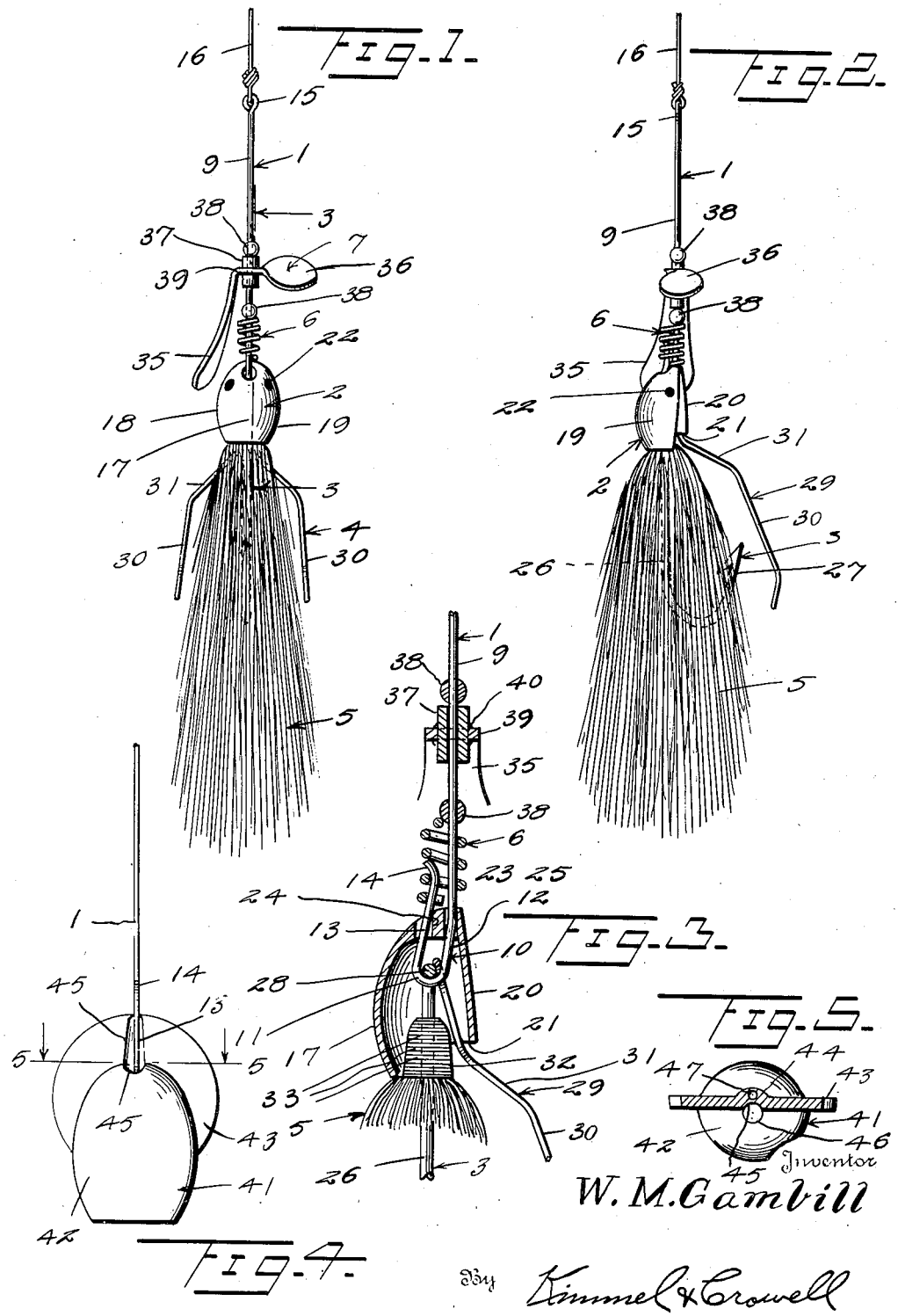
Inventor
W. M. Gambill
By Kimmel & Crowell
Attorneys Patented Oct. 22, 1940

2,219,225

UNITED STATES PATENT OFFICE 2,219,225

FISH LURE

William M. Gambill, Abilene, Tex., assignor to Raymond Carroll Gambill, Abilene, Tex.

Application July 18, 1939, Serial No. 285,148

3 Claims. (Cl. 43—42)

This invention relates to an artificial fish lure.

The invention aims to provide, in a manner as hereinafter set forth, an article of the class referred to including a carrier element for the simulation of a head of an insect or bug, a fish-hook and guard members and means associated with said element for latching said simulation thereon and with the simulation acting to prevent the separation of the fish-hook and guards from the carrier element.

The invention further aims to provide, in a manner as hereinafter set forth, an article of the class referred to including a carrier element, a spinner structure slidably mounted on said element and with the latching means aforesaid spacing said structure from the simulation referred to and constituting a resilient stop for and for limiting the extent of outward sliding of said structure on said element.

The invention further aims to provide an article of the class referred to including a slidably mounted spinner structure operating on the retrieve irrespective of how slow the retrieve is, and further with the said structure including means to cause the spinner to spin slowly.

The invention further aims to provide, in a manner as hereinafter set forth, an article of the class referred to which is comparatively simple in its construction and arrangement, strong, durable, compact, readily connected to a leader, thoroughly efficient in its use, conveniently assembled and disassembled when desired, and comparatively inexpensive to manufacture.

Embodying the aims aforesaid and others which may hereinafter appear, the invention consists of the novel construction, combination and arrangement of parts to be more specifically referred to and as illustrated in the accompanying drawing, wherein is shown an embodiment of the invention, but it is to be understood that changes, variations and modifications may be resorted to which fall within the scope of the invention as claimed.

In the drawing:

Figure 1 is a front elevation of an artificial fish lure in accordance with this invention, Figure 2 is a side elevation thereof, Figure 3 is a section on line 3—3 Figure 1, Figure 4 is a front elevation of a modified form of bug or insect simulation member, and Figure 5 is a section on line 5—5 Figure 4 with the carrier not shown.

An artificial fish lure, in accordance with this invention includes a carrier element 1, a bug or insect head simulation member 2, a fish-hook 3, a guard element 4, a bunch or group of hairs 5, a slidably mounted resilient latching element 6 and a spinner structure 7.

The carrier element 1 is constructed from a length of resilient wire 8 of the desired gauge bent to form a shaft part 9 and a forwardly opening substantially U-shaped coupling part 10 which is angularly disposed with respect to the part 9. The latter is of materially greater length than part 10. The part 10 includes a bight 11, an inner arm 12 and an outer arm 13 formed with an outwardly directed forward end portion 14 inclining outwardly from rear to front. The arm 12 is of less length than the arm 13. The rear end of the shaft part 9 merges into the forward end of the arm 12. The arms 12, 13 at their rear ends merge into the ends of the bight 11. The arm 12 is upon a slight curve and is disposed at an inward inclination throughout with respect to shaft part 9. The arm 13 from its rear end to its portion 14 is disposed at an inclination towards arm 12 and shaft part 9. The arm 13 extends forwardly with respect to rear end of arm 12. The major portion of the length of arm 13 opposes in spaced relation the outer end portion of shaft part 9. The bight 11 is curved and conforms in contour to the segment of a circle. The forward end of shaft part 9 is formed with an eye 15 for the purpose of connecting to such part a leader 16.

The member 2 is hollow, open at its rear end, constructed from a single piece of any suitable material and is substantially of ovoidal contour in front elevation. The member 2 includes a curved front portion 17, curved side portions 18, 19 and a curved rear portion 20 of less length than the said other portions. The portion 20 in transverse section is disposed upon an outwardly directed curve of a contour corresponding to the segment of a cirle. The portion 17 at its sides merges into the outer sides of the portions 18, 19 and at its forward end merges into the forward end of the portion 20. The portions 18, 19 at their forward sides merge into the sides and forward end of the portion 20. The latter has its rear end 21 spaced inwardly of the rear ends of the portions 17, 18, 19. The portions 18, 19 in proximity to their forward ends are formed with suitable means, as indicated at 22 to provide simulation of the eyes of the bug. The closed forward end part of member 2 is of greater thickness than the remaining part of the member and such thickened part is indicated at 23 (Figure 3). The part 23 tapers from portion 20 to the front of the member 2 and it is formed with a pair of spaced parallel openings 24, 25. The opening 24 is of greater width than the opening 25.

The hook 3 includes a shank 26, a bill 27 and an eye 28 at the forward end of the shank 26.

The guard element 4 which prevents the lure from becoming entangled with obstructions or in other words provides for the lure travelling over obstructions is formed from a length of wire 29 of the desired gauge. The wire 29 is bent upon itself to form a pair of spaced guard members 30 of angled contour and a tapered yoke-shaped coupling portion 31 for securing the members 30 together. The portion 31 also acts as a connector for element 4.

The bunch or group 5 of hairs is of a thickness to substantially conceal the hook and of a length to extend rearwardly from the hook. The bunch 5 has its forward end portion contracted, as at 32. The said portion 32 encompasses the shank 26 of the hook 3 in proximity to the eye 28 and it is secured to said shank by a cord or wire wrapping 33.

The resilient latching element 6 is in the form of a coiled spring 6 of the desired length and diameter and which not only functions as a latch for parts of the lure to be referred to, but also acts as a resilient stop for the structure 7.

The spinner structure 7 is slidably mounted on the shaft part 9 of the carrier element 1 and it includes a curved tapered spinner 35, a substantially circular blade 36 for slowing up the movement of the spinner 35, a bearing sleeve 37 common to the spinner 35 and blade 36 and a pair of apertured slidable abutments 38. The inner ends of the spinner 35 and blade 36 are connected together by a horizontal coupling part 39 which is integral therewith and formed with an axial opening 40 through which the sleeve 37 extends. The sleeve 37 is welded or otherwise secured, intermediate its ends to the edge of the opening 40 in the coupling part 39. The sleeve 37 and the abutments 38 are slidably mounted on the shaft part 9 of element 1. The abutments 38 are arranged at opposite ends of the sleeve 37. The spinner 35 is slightly torsionally twisted, extends forwardly from one side of the coupling part 39 and is disposed at an outward inclination relative to the shaft part 9 of the element 1. The blade 36 is torsionally twisted and is disposed substantially at right angles to the sleeve 37.

When assembling the lure, the wire stock which provides the carrier element is not bent to form the U-shaped part 10, but it is provided with the eye 15 at its forward end. The spinner structure 7 is first mounted on the stock, after which the latching element 6 is positioned on the stock forwardly of structure 7, then the member 2 is mounted on the stock by the passage of the latter through the opening 25. The structure 7, element 6, member 2 are then moved forwardly on the stock. The latter is then bent to form the U-shaped part 10. The eye of the hook and the coupling portion 31 of the guard element 4 are then mounted on the bight of the said part 10. The member 2 is then moved in a direction and to an extent to have opening or passage 25 arranged at the rear end of arm 12 of part 10 and with the arm 13 of the latter extending forwardly through the opening or passage 24. The latching element 6 will then be shifted to an extent whereby the forward end portion thereof surrounds and tightly binds against the arm 13 and the shaft part 9. The latching element 6 prevents the shifting of the member 2 on element 1 as the end portion 14 arrests the shifting off of the element 6 from the arm 12. The member 2 when in the position shown in Figure 3 prevents the hook 3 or guard element 4 from disconnecting from part 10 of carrier element 1. The guard members 30, when guard element 4 is attached to part 10 of element 1 are disposed at the front of the bunch of hairs 5. The coupling portion 31 of the element 4 extends rearwardly from within the member 2 and passes rearwardly of the edge 21 of the portion 20 of the member 2. The latter houses the rear ends of the hook 3, element 4 and bunch 5.

In the modified form of bug or insect simulating member, Figures 4 and 5, the said member is indicated generally at 41 and it includes an open bottom hollow body part 42 substantially of the same contour as the member 2. The body part 42 of member 41 at the point of mergence of the side and rear thereof is formed with a forwardly extending crescent-shaped flange 43 disposed laterally in opposite direction with respect to the sides and extended forwardly from the top of body part 42. At the transverse median of the rear face of flange 43 it is formed with a transversely disposed lateral offset 44. At the transverse median of the front face of the flange 43 it is formed with a transversely disposed groove 45. The forward end portion of body part 42 is provided with an opening 46 into which opens the rear end of groove 45. The flange 43 is formed with a passage 47 arranged in and opening at the forward end of offset. The rear end of passage 47 communicates with the opening 46. The inner arm 12 of the U-shaped part 10 of the carrier 1 extends rearwardly through passage 47 and opening 46 into body part 42. The outer arm 13 of portion 10 of carrier 1 extends forwardly through opening 46 and groove 45. The carrier 1 is latched to the member 41 in the same manner as it is latched to the member 2.

What I claim is:

1. In an artificial fish lure, a carrier element having a U-shaped portion at its rear end including a bight, a hook mounted at its forward end on and extended rearwardly from said bight, a guard element mounted at its forward end on and extended rearwardly from said bight, a hollow bug head simulating member formed with spaced openings at its forward end for the passage of the sides of said portion, said member having a rear open end through which extends said hook and guard element, said member concealing said bight and the inner ends of and preventing the separation of the hook and guard element from said portion, and resilient means forwardly of said member encompassing and engaging with one of the sides of said portion and a part of the carrier element forwardly of the other side of said portion and forwardly of said member for securing said member on the carrier element.

2. In an artificial fish lure, a carrier element having a U-shaped portion at its rear end including a bight, a hook mounted at its forward end on and extended rearwardly from said bight, a guard element mounted at its forward end on and extended rearwardly from said bight, a hollow bug head simulating member formed with spaced openings at its forward end for the passage of the sides of said portion, said member having a rear open end through which extends said hook and guard element, said member concealing said bight and the inner ends of and preventing the separation of the hook and guard element from said portion, resilient means forwardly of said member encompassing and engaging with one of the sides of said portion and a part of the carrier element forwardly of the other side of said portion and forwardly of said member for securing said member on the carrier element, a bunch of hairs secured at its forward end to said hook, extending rearwardly from the latter and guard element and concealing the major portion of the length of the hook, and the said guard element including guard members positioned in laterally extended relation in opposite directions with respect to the forward terminal portion of the bunch.

3. In an artificial fish lure, a carrier including a rearwardly directed shaft and a rearwardly directed U-shaped portion having one of its sides of greater length than its other, said shaft merging at its rear end into the forward end of the shortest side of the said U-portion, the sides of said U-portion being angularly disposed with respect to said shaft, a fish hook and a guard element extended rearwardly from and having their forward ends connected to the bight of said U-portion, a hollow rearwardly directed bug head simulating member having an open rear end and its forward end provided with a pair of spaced openings, the sides of the said U-portion extending forwardly through and correlating with the walls of the said openings for disposing the said bight within and centrally of the said member, the said fish hook and the said element extending rearwardly through the rear open end of said member, the forward end of said member correlating with the sides of the said U-portion to prevent the separation of the said fish hook and the said element from the carrier, and a slidable resilient latching member mounted on that side of greatest length of the said U-portion and on the rear portion of the said shaft forwardly of said member for detachably securing the latter to the carrier.

WM. M. GAMBILL.